J. L. MALM.
PROCESS OF TREATING METAL AND MINERAL BEARING MATERIALS.
APPLICATION FILED AUG. 9, 1909.
1,049,746.
Patented Jan. 7, 1913.
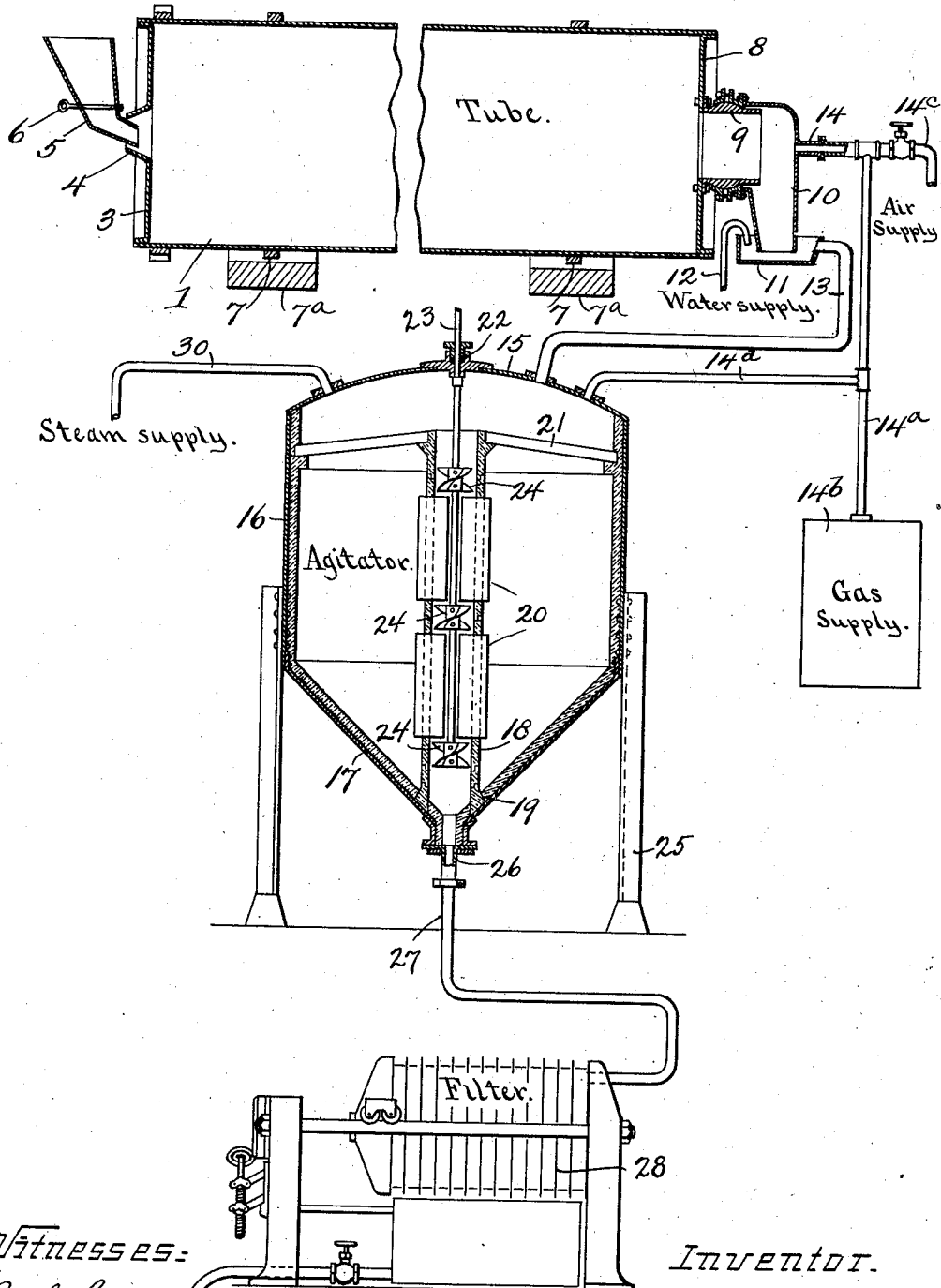

UNITED STATES PATENT OFFICE.

JOHN L. MALM, OF DENVER, COLORADO.

PROCESS OF TREATING METAL AND MINERAL BEARING MATERIALS.

1,049,746.  Specification of Letters Patent.  Patented Jan. 7, 1913.

Application filed August 9, 1909. Serial No. 512,013.

*To all whom it may concern:*

Be it known that I, JOHN L. MALM, a citizen of the United States, residing at Denver, in the county of Denver and State of Colorado, have invented certain new and useful Improvements in Processes of Treating Metal and Mineral Bearing Materials, of which the following is a specification.

This invention relates to a process for treating metal and mineral bearing materials generally, but is particularly applicable to the treatment of such materials containing sulfur.

The process may be stated to consist, in one of its broad aspects, in subjecting the metal and mineral bearing materials, in a suitable receptacle, to the action of a gas which will form soluble salts of the metals and in maintaining the temperature in the receptacle at a low point during the process.

More specifically the invention relates to a process for treating ores containing sulfur whereby the ore, preferably prepared in a finely divided condition, is subjected to an atmosphere of substantially dry gas whereby the sulfur is separated out and the metals, having an affinity for such gas, are left in the form of salts which are freely soluble in a suitable liquid from which, after it has been filtered or decanted, the metal or metals may be recovered by any suitable process.

Still more specifically the invention relates to a process for treating sulfid ores wherein the ore preferably in a finely divided condition is subjected, in a suitable receptacle, to the action of a halogen gas preferably chlorin which is supplied to the receptacle in a manner such that the temperature within the receptacle is maintained at a low point so that the sulfur does not become plastic and the formation of lumps or a cake on the inside of the receptacle is prevented.

Invention also resides in the feeding of a cooling agent preferably air with the halogen gas into the receptacle for assisting in the maintenance of a low temperature in the receptacle and for supplying moisture with the dry halogen gas to assist in its action. Thus, by proceeding as above stated, the process may be carried on without producing either sulfur mono-chlorid ($S_2Cl_2$) or plastic sulfur ($S_2$) which are highly objectionable as before intimated, and whose presence would prohibit the commercial treatment of many ores or mineral bearing materials for the reason that the ore would cake on the inside of the mill and form balls or lumps which would prevent even a fair action of the halogen gas upon the ore. By this treatment some of the metals, viz: the iron and the copper are rendered in the "ous" condition, cuprous chlorid ($Cu_2Cl_2$) and ferrous chlorid ($FeCl_2$) where chlorin is used as the gas, the "ic" condition, viz: cupric chlorid ($CuCl_2$) and the ferric chlorid ($FeCl_3$) being formed only in an atmosphere containing an excess of the halogen gas.

Still further invention resides in the charging of the pulp, which has been acted upon in the first receptacle, into a suitable agitator with a liquid, preferably water, and a halogen gas, whereby the metal or metals which have been only partially acted on in the first receptacle are still further treated so that all metals are finally formed into salts which are soluble in water or in solution of other metals, this result being attained by an excess of halogen gas furnished to the agitator.

The invention may be further briefly summarized as consisting in the details of the process hereinafter set forth in the following description and claims.

The steps of my process as preferably carried out are as follows:—The crushed ore is continuously fed in at one end of a suitable receptacle preferably a revolving tube, drum or barrel and permitted to discharge at the opposite end. During its course through the tube it is subjected to the action of chlorin gas which is preferably supplied to the discharge end of the receptacle and the temperature is maintained at a point below that at which sulfur mono-chlorid or plastic sulfur would be formed, either in a manner of feeding and the regulation of the feeding of the ore and chlorin, or by the addition of a cooling agent such as air with the chlorin, so that there is no cake formed on the wall of the tube and no lumping of the ore. During this part of the process certain of the metals having an affinity for chlorin combine with the chlorin and form chlorids in the "ous" condition. When certain metal or metals have combined with the chlorin to a predetermined point the ore is then ready for the next step of the process. The partially chloridized pulp from the first receptacle, is transferred to a so-called agitator, and on agitation in a suitable liquid in the presence of heat, preferably water or mill solutions, in the presence of a free halogen gas, is completely chloridized and all the metals pass into solution. The partial chloridization carried on in the first receptacle, as above stated, merely delivers one or more of the metals, for example copper and iron, to the agitator in the "ous" condition, and where chlorin is used they would appear as cuprous chlorid ($Cu_2Cl_2$) and ferrous chlorid ($FeCl_2$), the "ic" condition of these metals, where chlorin is used, viz: the cupric chlorid ($CuCl_2$) and the ferric chlorid ($FeCl_3$), as before stated, being formed only in an atmosphere of excess chlorin or after all other metals have been chloridized. The action in the agitator is one wherein the "ous" salts of a metal or metals which are soluble in a liquid such as water, or any solution of other metallic salts, pass into solution, and on the addition of the halogen gas, the valency of the "ous" salts is increased to the "ic" condition, for instance the "ous" chlorids are converted into the "ic" chlorids and in the example above stated the cuprous chlorid is converted into the cupric chlorid and the ferrous into ferric. The "ic" salts in solution then attack the free sulfids which were not attacked in the first receptacle and react with them to form additional "ous" salts of the metal or metals, converting the "ic" salts back to the "ous" salts. By the prolonged addition of free chlorin and by the agitation of the solution, the "ous" salts are again chloridized to the "ic" salts and this cycle of reaction continues until all of the metals present are converted into the "ic" condition. In carrying out the above process, in addition to the sulfids, the oxids and most of the native metals, gold (Au) and silver (Ag) are chloridized by the "ic" chlorids and pass into solution. Steam may be supplied to the agitator for the purpose of supplying pressure and heat which assist in the conducting of the process, and further assist in discharging the material from the agitator to the filter press. The solution at this point is then filter pressed or decanted as desired and treated in a manner to recover the metals therefrom. If there be silver present in the ore the second step of the process, viz: the treatment in the agitator in solution, must be in the presence of heat, that is the solution must be hot for silver chlorid only passes in solution in the presence of other chlorids in a hot solution.

In the drawings the figure represents a suitable apparatus for conducting the process.

In carrying out the process any preferred form and construction of apparatus may be employed but I have shown one form which is very efficient in operation, and in such embodiment 1 represents a revolving tube, barrel or drum provided at one end with a head 3 having a central receiving orifice 4 into which projects a suitable chute 5 provided with a slide 6 for regulating the supply of the ore or metal bearing materials into the tube. The tube is also provided with tires 7 which are adapted to revolve in suitable cradles 7ª provided with rollers common in this type of mill. The tube 1 is still further provided at its opposite end with a head 8 having thereon a trunnion-like discharge member 9 rotatably mounted in a discharge chute 10 which empties into a suitable vessel 11 adapted to be filled with water by a pipe 12 from any suitable supply, to a sufficient height such that there is a seal at the lower end of the chute 10. This vessel 11 is provided with a pipe 13 for a purpose to be described. The chute 10 is still further provided with a connection 14 which is adapted to supply chlorin, or other gas, used in the process, to the tube 1. A pipe 14ª connected to a suitable chlorin gas container 14ᵇ, leads to the connection 14 and furnishes the gas for the step of the process conducted in the tube. An air supply pipe 14ᶜ leads into the chlorin supply pipe and serves to cool the tube and to add moisture as will be explained. The pipe 13 leads to the head 15 of a receptacle 16 which is provided with a conical bottom 17 and is termed the agitator tank. This tank may be provided with any suitable form of agitating means, but in this instance it is provided with a tube or tubular member 18 supported at the bottom of the receptacle on suitable supports 19 and having extending radially into the tube suitable blades 20 which prevent the liquid from swirling within the same. This tube 18 is supported at its upper end by radially disposed members 21.

Rotatably mounted in a stuffing box 22 in the head 15 is a shaft 23 which extends down through the tube or tubular member 18 and is provided with flights 24 which are adapted to draw the solution from the bottom of the agitator tank and force it out at the top, thus causing an agitation therein. This agitator tank may be mounted upon suitable supports 25 secured to suitable masonry, not shown. The lower end of the agitator tank is provided with a discharge connection 26 which is provided with a flexible tubular portion 27, such as rubber hose, provided with suitable valve, connected with a suitable filter press 28 of any preferred construction. Since the construction of the filter press is not of importance in the present instance a further description of the same will not be given. A pipe 14ᵈ leads from the pipe 14ª to the top of the agitator tank for supplying chlorin thereto. A steam supply pipe 30 is preferably connected to the head 15 of the agitator for supplying a pressure to the same and adding heat.

In conducting the process with the apparatus, the ore, which has been previously dried so that any mechanically admixed water is eliminated therefrom, is crushed to suitable fineness and this pulverized ore is fed into the chute 5 and is regulated in its feed by the slide 6. The tube is then rotated in any preferred manner and dry chlorin gas is admitted from the pipe 14$^a$ into the tube. If the temperature cannot be maintained at the desired low point by regulating the feed of the ore and chlorin, air may be supplied in any required volume through the pipe 14$^c$. The admission of air with the dry chlorin prevents a rise in temperature to the point of forming sulfur mono-chlorid ($S_2Cl_2$) or plastic sulfur ($S_2$) and also the lumping and caking of the ore which would result in the building up of the head due to the action of the gas on the ore, and further adds a degree of moisture to the gas which assists in the operation of chloridization. This step of the process is carried only to the point of partially chloridizing the ore. When the ore is partially chloridized in the tube it gradually passes through the discharge member 9 down through the chute 10 into the vessel 11 where it is mixed with water or mill solutions or any other preferred liquid and through the pipe 13 into the agitator tank where it is agitated with free chlorin which converts the "ous" chlorids produced in the tube 1 to "ic" chlorid in solution, and these chlorids act upon the sulfids which have not already been acted upon or attacked by the chlorin in the tube and converts them to "ous" chlorids, at the same time reducing themselves to the "ous" condition. Finally, after all the sulfids have been attacked, all metals are converted to the "ic" condition and pass into solution, the sulfur remaining in the gangue, separated from the metals which have gone into solution. The solution may then pass from the agitator into the filter press where the solution is filtered off. This solution may be decanted if desired, but in any event after the gangue has been removed from the solution the latter may be then treated for the recovery of the metals.

Having described my invention, I claim:—

1. The herein described process of treating ore which consists in subjecting the dry ore in a receptacle to the action of a soluble salts-forming gas, and introducing a cooling agent with the gas.

2. The herein described process of treating ore which consists in subjecting the dry ore in a suitable receptacle to the action of a halogen gas, and introducing a cooling agent with the halogen gas in the receptacle.

3. The herein described process of treating ore which consists in subjecting the same in a suitable receptacle to the action of a salts-forming gas for a sufficient length of time to form the salts of only a part of the metal or metals, and introducing a cooling agent with the halogen gas in the receptacle.

4. The herein described process of treating ore which consists in subjecting the same to the action of a halogen gas in a receptacle for a sufficient length of time to deliver salts of a part only of the metal or metals in the "ous" condition, and introducing into the receptacle with the gas a cooling agent.

5. The herein described process of treating metal bearing substances which consists in continuously charging such substances into a suitable receptacle and discharging the same therefrom, and supplying to the receptacle a halogen gas in a cold condition, the supplying of the halogen gas in a cold condition and the continuous charge and discharge operating to prevent more than a predetermined rise in temperature.

6. The herein described process of treating sulfid ores containing a metal or metals which consists in subjecting the ore to the action of a salts-forming gas capable of separating the sulfur and delivering the salts of a part of the metal or metals, and introducing a cooling agent into the receptacle with the gas.

7. The herein described process of treating sulfid ores which consists in subjecting the ore in a suitable receptacle to the action of a salts forming agent in a manner to deliver a portion of the metal or metals in the form of a salts, and introducing a cooling agent for preventing the lumping and caking of the ore by preventing a rise in temperature to the point of lumping and caking.

8. The herein described process of producing salts of a metal or metals from dry ore which consists in subjecting such dry ore to the action of a soluble salts forming gas in a suitable receptacle, and maintaining a low temperature throughout the entire operation.

9. The herein described process of treating metal and mineral bearing materials which consists in continuously feeding and discharging the pulverized material to a suitable receptacle and subjecting the material in such receptacle to the action of a halogen gas, and further maintaining a low temperature within the receptacle.

10. The herein described process of treating ore which consists in subjecting such materials in a dry state in a suitable receptacle to the action of chlorin gas and maintaining the temperature in such receptacle at a low point.

11. The herein described process of treating metal and mineral bearing materials containing sulfur which consists in subjecting such materials in a suitable receptacle to the action of chlorin gas, and maintaining the temperature in such receptacle below the point of the formation of sulfur monochlorid and plastic sulfur.

12. The herein described process of treating ore which consists in subjecting such materials to the action of chlorin gas in a receptacle, and introducing air with such gas to maintain a low temperature within the receptacle.

13. The herein described process of treating metal and mineral bearing materials which consists in partially chloridizing such materials with chlorin in a dry way and then agitating the partially chloridized materials in a suitable liquid in the presence of free chlorin whereby substantially all the metals not acted on by the gas in the first step are chloridized in the solution.

14. The herein described process of treating metal and mineral bearing materials which consists in subjecting the materials to dry chlorin at a low temperature then further chloridizing the materials in a solution until all the metals pass into solution.

15. The herein described process of treating metal bearing materials which consists in subjecting the materials to the action of a halogen gas for a sufficient length of time to form "ous" salts of one or more of the metals and then subjecting the materials in a liquid to the further action of a halogen gas in excess until the "ous." salts and the metals not previously attacked by the halogen gas are finally converted to the "ic" salts and pass into solution.

16. The herein described process of treating metal bearing materials which consists in subjecting the materials to the action of chlorin at a low temperature so as to partially chloridize certain of the metals, and then subjecting such materials to the further action of chlorin until the partially chloridized metals and the metals previously unattacked by the chlorin are fully chloridized and pass into solution.

17. The herein described process of treating metal bearing materials which consists in subjecting the materials to the action of chlorin for a sufficient length of time until one or more of the metals are converted into salts in the "ous" condition, and then treating such materials in an agitator containing hot liquid and chlorin until said salts and a metal or metals previously unattacked by the chlorin are converted to salts in the "ic" condition and pass into solution.

18. The herein described process of treating ores which consists in subjecting the ore to a chlorin atmosphere in a dry way until partial chloridization takes place and then agitating the ore in a hot liquid in the presence of chlorin until further chloridization takes place and the metal salts pass into solution.

19. The herein described process of treating crushed ores which consists in subjecting the ore to the action of dry chlorin until one or more metals are partially chloridized and then agitating the ore in a liquid in the presence of free chlorin until the total chloridization takes place and the salts pass into solution.

20. The herein described process of treating ores which consists in subjecting the dry ore to dry chlorin at a low temperature until partial chloridization takes place, and then agitating the partially chloridized ore in hot liquid and in the presence of chlorin until the total chloridization takes place and the salts pass into solution.

21. The herein described process of treating ores which consists in subjecting the substantially dry ore to dry chlorin gas until certain metals are partially chloridized, and then agitating the ore in a hot liquid in the presence of an excess of free chlorin until the total chloridization takes place and the salts pass into solution.

In testimony whereof I affix my signature in presence of two witnesses.

JOHN L. MALM.

Witnesses:
    HARRY J. WOLF,
    FRED E. COE.